Patented Apr. 23, 1946

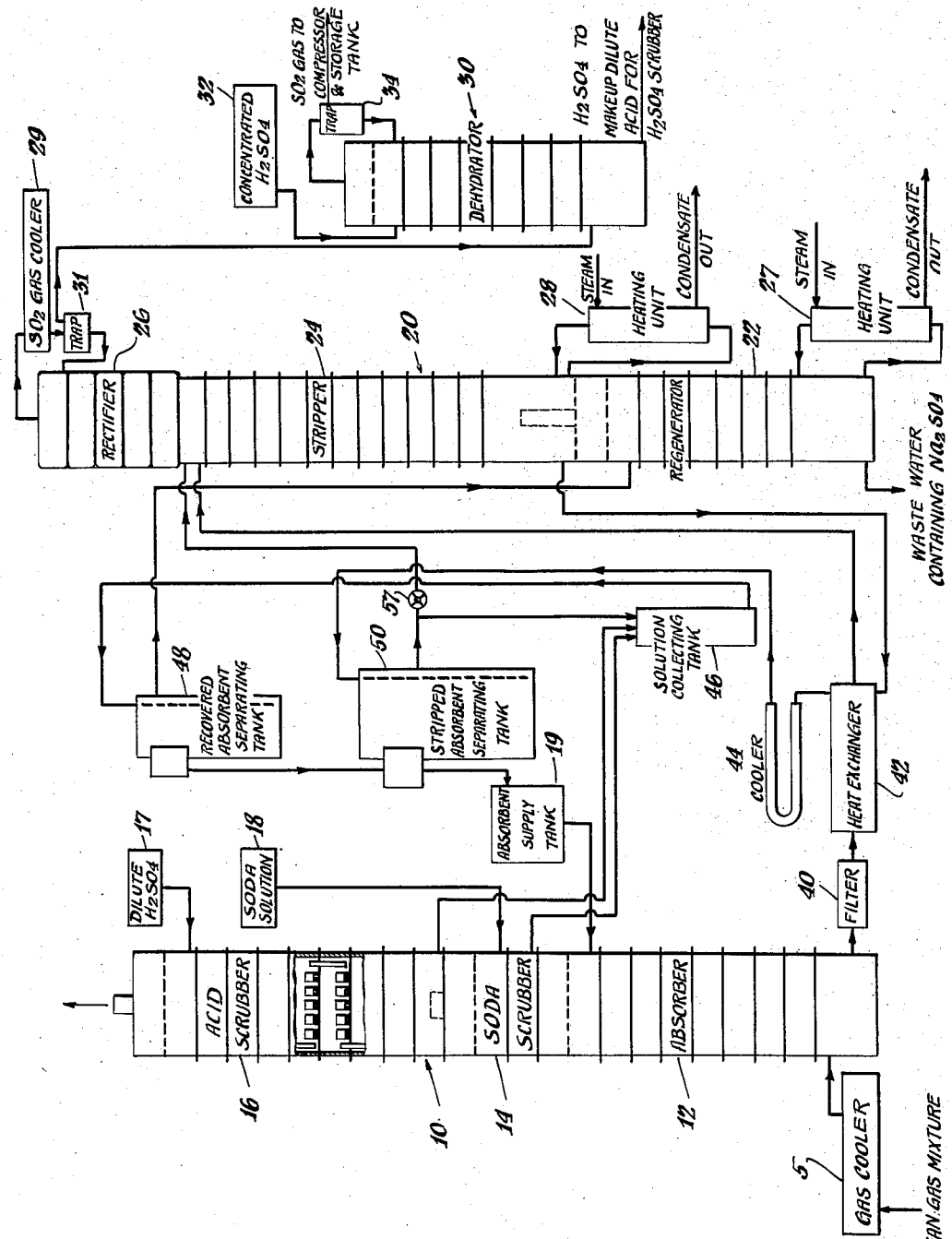

2,399,013

UNITED STATES PATENT OFFICE 2,399,013

PROCESS FOR THE RECOVERY OF SULPHUR DIOXIDE FROM GAS MIXTURES

Edward P. Fleming, Los Angeles, Calif., and T. Cleon Fitt, Salt Lake City, Utah, assignors to American Smelting and Refining Company, New York, N. Y., a corporation of New Jersey Application September 12, 1944, Serial No. 553,692

6 Claims. (Cl. 23—178)

This invention relates to the recovery of sulphur dioxide from gas mixtures and, more particularly, to processes utilizing organic-base absorbents in effecting such recovery. In certain of its aspects, the present invention is an improvement of that covered by United States Letters Patent No. 2,295,587, granted September 15, 1942, to Edward P. Fleming and T. Cleon Fitt.

It is known to recover sulphur dioxide from gas mixtures by first absorbing the sulphur dioxide in an organic base, such as various of the aromatic amines, and thereafter expelling the sulphur dioxide by heating the organic-base absorbent. In the course of operation of such processes some of the organic base is oxidized to the sulphate and various proposals have been made to correct this condition, based on the concept of adding sodium sulphite or such other sodium compound as will react with the organic-base sulphate to form sodium sulphate and release the organic base for further absorption of sulphur dioxide.

In processes of the type referred to, one of the principal costs of operation is that entailed in providing the steam (or other heat) used in stripping and regenerating the absorbent. The amount of absorbent irrevocably lost to the system for each unit of sulphur dioxide recovered and the amounts of other reagents consumed by the process are among the other factors determinative of its operating economy.

It is an object of the invention to eliminate the necessity for heating in recovering absorbent from certain phases of such processes and returning it in non-sulphate form for absorbing further quantities of sulphur dioxide. It is a further object of the invention to facilitate maintaining the liquid phases of the process in proper balance, both as to volume and chemical content, to the end that the absorbent and other reagents are employed at maximum efficiency.

Among other features, the invention embraces the new and novel features of operation and the new and original arrangements and combinations of steps hereinafter more fully described and set forth with particularity in the appended claims.

The drawing accompanying the specification and forming a part thereof is a flow sheet according to the process of the invention and illustrates, diagrammatically, a plant for its practice.

Referring to the drawing, reference characters 10 and 20 designate towers of the bubble plate type, preferably of homogenized lead-steel construction, the tower 10 comprising an absorber 12, soda scrubber 14 and acid scrubber 16, and the tower 20 comprising a regenerator 22, stripper 24 and rectifier 26.

Suitably connected with tower 10 are gas cooler 5, dilute acid supply tank 17, soda solution supply tank 18 and absorbent supply tank 19. Steam heating units 27 and 28 of the calandria type are provided at the bases of regenerator 22 and stripper 24, respectively. A gas cooler 29 and associated condensate trap 31 are provided between the rectifier 26 and a dehydrator 30 which is of the bubble plate type. A concentrated acid tank 32 is provided for dehydrator 30 and a trap at the gas outlet of the dehydrator is indicated at 34.

Further indicated in the drawing, are a filter 40, heat exchanger 42, cooler 44, solution collecting tank 46, recovered absorbent separating tank 48, and stripped absorbent separating tank 50. Except for a valve 51, such details as pumps, valves, meters, etc., are omitted for the sake of clarity.

Employing anhydrous dimethyl aniline as the absorbing medium, the invention may be practised as follows: a clean gas mixture containing sulphur dioxide is passed through cooler 5 into the base of absorber 12 where it passes upwardly in countercurrent flow to anhydrous dimethyl aniline supplied to the top tray of absorber 12 from absorbent supply tank 19, the result being that sulphur dioxide is transferred from the gas mixture to the dimethyl aniline absorbent. Inasmuch as the reaction is exothermic and because the amount of sulphur dioxide that can be absorbed by a given volume of dimethyl aniline is greater at lower than at higher temperatures, suitable cooling means (not shown) are provided for the absorber 12, as is known to the art, in order to remove the heat of reaction and thereby enhance the transfer capacity of the absorbent. From the absorber 12, the gas mixture passes sequentially through soda scrubber 14 and acid scrubber 16, irrigated respectively with soda solution from tank 18 and dilute sulphuric acid from tank 17, and thence to the atmosphere. Whereas the gas mixture emerging from the absorber contains a small amount of sulphur dioxide and significant quantities of absorbent, it leaves the acid scrubber very low in sulphur dioxide and practically devoid of absorbent.

The dimethyl aniline pregnant with sulphur dioxide is withdrawn from the base of absorber 12, passed through filter 40 and then through heat exchanger 42 where it takes up heat from hot stripped dimethyl aniline delivered to the exchanger from the base of the stripper 24. From the heat exchanger 42, the pregnant absorbent is conducted to the top tray of stripper 24 wherein the sulphur dioxide is released as the absorbent passes downwardly in countercurrent flow to steam entering the bottom of the stripper from the top of regenerator 22 supplemented, if necessary, by steam generated from stripped absorbent in the base of the stripper 24 by heating unit 28.

After being released from the absorbent in the stripper, the sulphur dioxide passes into rectifier 26 (irrigated with the condensate next mentioned) and thence to sulphur dioxide gas cooler 29, the condensate from the cooler being separated from the sulphur dioxide and collected in trap 31 from whence the condensate is returned to the top tray of rectifier 26 and the sulphur dioxide conducted to the base of dehydrator 30. In the dehydrator, the sulphur dioxide is dried by countercurrent flow with concentrated sulphuric acid fed to the top tray of dehydrator 30 from supply tank 32. Upon leaving the dehydrator the dry, concentrated sulphur dioxide gas is passed through trap 34 to free it of acid, the latter being returned to the dehydrator, and the pure sulphur dioxide appropriately compressed to liquid for storage, sale or other use. The acid from the dehydrator is further diluted and sent to tank 17 for use in scrubber 16.

Following desorption, the stripped absorbent is conducted from the base of stripper 24 to heat exchanger 42 where it gives up heat to pregnant absorbent from absorber 12 as hereinbefore mentioned and is then further cooled in cooler 44. The cold stripped absorbent is next introduced into tank 50 wherein a separation is effected between the dimethyl aniline and water phases of the stripped absorbent. The anhydrous dimethyl aniline thus separated is then returned to absorbent supply tank 19 for recycling to absorber 12 and the water phase is withdrawn from tank 50 and sent to solution collecting tank 46 which also receives the soda and acid solutions from scrubbers 14 and 16. As an aid in maintaining a proper water balance in the absorption-desorption cycle, provision is made for bleeding off through valve 51 and sending to stripper 24 as required, a portion of the water phase going from tank 50 to tank 46. Experience has demonstrated that maintaining a proper water balance in this manner is wholly compatible with supplying at least a very substantial portion of the water phase from tank 50 to the collecting tank 46.

From the collecting tank 46, the composite solution is sent to tank 48 wherein a preliminary separation of dimethyl aniline is effected, the dimethyl aniline being sent to absorbent supply tank 19 for use in the absorbing step of the cycle and the remainder of the composite solution being sent to regenerator 22. The solution in the regenerator is heated sufficiently to regenerate and boil off practically completely the dimethyl aniline therein contained, the dimethyl aniline vapor and accompanying steam entering the base of the stripper 24 thereby returning the dimethyl aniline to the system and supplying steam (heat) for the stripping (desorption) operation.

By effecting a preliminary separation of absorbent in tank 48 prior to sending the composite solution to the regenerator 22 as above described, it has been found that the bulk of absorbent in said solution can be readily recovered for reuse in the absorbing step. Not only is no heat required to recover this portion of the absorbent, but the procedure has the further advantage of being a material aid in maintaining the system in proper chemical balance. Thus, a decrease in absorbent separation in tank 48 indicates that the system is deficient in sodium sulphite. In such case, action can be taken promptly to remedy the condition by increasing the flow from the soda tower, thereby conserving steam in the regenerator and guarding against the possible loss of absorbent in the waste water therefrom.

While the use of anhydrous dimethyl aniline as the absorbent and in the manner above described represents the preferred practise, the invention may be employed with beneficial results using other organic-base absorbents, e. g., a mixture of water and an aromatic amine such as dimethyl aniline, toluidine, xylidine or the like. In addition, the advantages of the invention can be realized, at least in part, in processes varying in certain respects from the flow sheet shown in the accompanying drawing. Thus, in a process in which the soda scrubber is omitted and the acid scrubber is relied upon alone to remove the organic-base absorbent accompanying the effluent gases from the absorber, sodium sulphite (or other sodium compound which will react with the sulphate of the organic base to free the latter and form sodium sulphate) from another source may be mixed with a part or all of the water phase separated from the stripped absorbent and the solution from the acid scrubber, the resulting composite solution being subjected to preliminary separation of absorbent as hereinbefore described prior to being sent to the regenerator. Another variation consists in sending the water phase from the stripped absorbent direct to the regenerator, while sending only the solution from the acid scrubber and the solution from the soda scrubber (or suitable alkali reagent from another source in processes not employing the soda scrubber) to the recovered absorbent separating tank for preliminary separation. In such case the sodium compound should be in sufficient excess to provide for regeneration of the organic-base absorbent contained in the water phase sent directly to the regenerator.

It will be apparent from the foregoing description that the present invention affords definite advantages in recovering sulphur dioxide from gas mixtures by organic-base absorbent processes. While certain specific terms are used in the specification and claims in describing and defining the invention, it is intended that they embrace the use of their equivalents within the scope and spirit of the invention, e. g., the use of alkali compounds other than soda or sodium sulphite to perform the function of releasing the organic base from its sulphate and forming soluble sulphate whereby the sulphate radical can be bled from the system in the waste water.

What is claimed is:

1. In a process for recovering sulphur dioxide from a mixture of gases containing the same comprising absorbing sulphur dioxide from the mixture with an organic-base absorbent, stripping the absorbent of sulphur dioxide by heating and recovering the liberated sulphur dioxide, separating a water phase from the stripped absorbent and returning the stripped absorbent less such water phase to the absorbing step, scrubbing the effluent gases from the absorbing step separately with solutions of soda and of sulphuric acid, regenerating absorbent by mixing the scrubbing solutions and at least a very substantial portion of the water phase from the stripped absorbent and heating the resultant mixture to drive off absorbent with water vapor leaving absorbent-impoverished waste water, passing the regenerated absorbent with accompanying water vapor into the body of absorbent being stripped of sulphur dioxide, and discarding waste water from the process, that improvement which comprises effecting a preliminary separation of absorbent, from the mixture of scrubbing solutions and water phase from the stripped absorbent, prior to heating the mixture in the regenerating step aforesaid, and returning the absorbent thus separated to the absorbing step without passing through said stripping step.

2. In a process for recovering sulphur dioxide from a mixture of gases containing the same comprising absorbing sulphur dioxide from the mixture with dimethyl aniline, stripping the dimethyl aniline of sulphur dioxide by heating and recovering the liberated sulphur dioxide, separating water from the stripped dimethyl aniline and returning the dimethyl aniline to the absorbing step, scrubbing the effluent gases from the absorbing step separately with solutions of soda and of sulphuric acid, regenerating dimethyl aniline by combining the scrubbing solutions with at least a very substantial portion of the water separated from the stripped dimethyl aniline and heating the resultant mixture to drive off dimethyl aniline with water vapor leaving waste water impoverished in dimethyl aniline, passing the regenerated dimethyl aniline with accompanying water vapor into the body of dimethyl aniline being stripped of sulphur dioxide, and discarding waste water from the process, that improvement which comprises effecting a preliminary separation of dimethyl aniline, from the mixture of scrubbing solutions and water separated from the stripped dimethyl aniline, prior to heating the mixture in the regenerating step aforesaid, and returning the dimethyl aniline thus separated to the absorbing step without passing through said stripping step.

3. The process for recovering sulphur dioxide from gas mixtures containing same which comprises absorbing sulphur dioxide from the mixture with an organic-base absorbent, stripping the absorbent of sulphur dioxide by heating and recovering the liberated sulphur dioxide, separating a water phase from the stripped absorbent and returning the stripped absorbent less said water phase to the absorbing step, scrubbing the effluent gases from the absorbing step with dilute sulphuric acid, forming a composite solution by mixing the dilute sulphuric acid solution from the scrubbing step and at least a very substantial portion of the water phase from the stripped absorbent with sodium sulphite, effecting a preliminary separation of absorbent from said composite solution and returning such absorbent directly to the absorbing step, heating the remainder of the composite solution to drive off absorbent with water vapor leaving an absorbent-impoverished waste water, and passing the absorbent with accompanying water vapor into the body of absorbent being stripped of sulphur dioxide.

4. The process for recovering sulphur dioxide from gas mixtures containing same which comprises absorbing sulphur dioxide from the mixture with dimethyl aniline, stripping the dimethyl aniline of sulphur dioxide by heating and recovering the liberated sulphur dioxide, separating a water phase from the stripped dimethyl aniline and returning the stripped dimethyl aniline less said water phase to the absorbing step, scrubbing the effluent gases from the absorbing step with dilute sulphuric acid, mixing the dilute sulphuric acid solution from the scrubbing step and at least a very substantial portion of the water phase from the stripped absorbent with sodium sulphite to form a composite solution, effecting a preliminary separation of dimethyl aniline from said composite solution and returning same directly to the absorbing step, heating the remainder of the composite solution to drive off dimethyl aniline and water vapor leaving a waste water impoverished in dimethyl aniline, and passing the dimethyl aniline with accompanying water vapor into the body of dimethyl aniline being stripped of sulphur dioxide.

5. The process for recovering sulphur dioxide from gas mixtures containing the same which comprises absorbing sulphur dioxide from the mixture with an organic-base absorbent, stripping the absorbent of sulphur dioxide by heating and recovering the liberated sulphur dioxide, separating a water phase from the stripped absorbent and returning the stripped absorbent less said water phase to the absorbing step, scrubbing the effluent gases from the absorbing step with soda and sulphuric acid solutions, the soda being in sufficient excess of that required to react with the organic-base sulphate content of the acid scrubbing solution to balance the system as a whole, combining the soda and acid solutions and effecting a preliminary separation of absorbent from the composite solution, returning the absorbent thus preliminarily separated to the absorbing step, heating the remainder of the composite solution with at least a very substantial portion of the water phase from the stripped absorbent to drive off absorbent with water vapor, and passing said absorbent with accompanying water vapor into the body of absorbent being stripped of sulphur dioxide.

6. The process for recovering sulphur dioxide from gas mixtures containing the same which comprises absorbing sulphur dioxide from the mixture with dimethyl aniline, stripping the dimethyl aniline of sulphur dioxide by heating and recovering the liberated sulphur dioxide, separating a water phase from the stripped dimethyl aniline and returning the stripped dimethyl aniline less said water phase to the absorbing step, scrubbing the effluent gases from the absorbing step with soda and sulphuric acid solutions, the soda being in sufficient excess of that required to react with the organic-base sulphate content of the acid scrubbing solution to balance the system as a whole, combining the soda and acid solutions and effecting a preliminary separation of dimethyl aniline from the composite solution, returning the dimethyl aniline thus preliminarily separated to the absorbing step, heating the remainder of the composite solution with at least a very substantial portion of the water phase from the stripped dimethyl aniline to drive off absorbent with water vapor, and passing said dimethyl aniline with accompanying water vapor into the body of dimethyl aniline being stripped of sulphur dioxide.

EDWARD P. FLEMING.
T. CLEON FITT.